United States Patent
Brock (10) Patent No.: US 10,373,221 B1
(45) Date of Patent: Aug. 6, 2019

(54) ON-DEVICE DIRECTORY SEARCH

(71) Applicant: Square, Inc., San Francisco, CA (US)

(72) Inventor: Zachary Brock, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 15/913,250

(22) Filed: Mar. 6, 2018

Related U.S. Application Data (62) Division of application No. 13/786,403, filed on Mar. 5, 2013, now Pat. No. 9,934,523.

(51) Int. Cl.
*G06Q 30/00* (2012.01)
*G06Q 30/06* (2012.01)

(52) U.S. Cl.
CPC ..... *G06Q 30/0601* (2013.01); *G06Q 30/0625* (2013.01); *G06Q 30/0639* (2013.01)

(58) Field of Classification Search
CPC .......... G06Q 30/0601; G06Q 30/0625; G06Q 30/0639
USPC ............................................... 705/26.1–27.2
See application file for complete search history.

(56) References Cited

U.S. PATENT DOCUMENTS

| | | | |
|---|---|---|---|
| 5,257,348 A | 10/1993 | Roskowski et al. | |
| 5,860,073 A | 1/1999 | Ferrel et al. | |
| 6,281,897 B1 | 8/2001 | Berry et al. | |
| 6,381,603 B1 | 4/2002 | Chan et al. | |
| 6,408,292 B1 | 6/2002 | Bakalash et al. | |
| 6,587,835 B1 | 7/2003 | Treyz et al. | |
| 6,772,132 B1 | 8/2004 | Kemp, II et al. | |
| 6,776,304 B2 | 8/2004 | Liff et al. | |

(Continued)

FOREIGN PATENT DOCUMENTS

| KR | 10-2004-0081672 A | 9/2004 |
|---|---|---|
| WO | 2012/162125 A1 | 11/2012 |
| WO | 2013/184844 A2 | 12/2013 |

OTHER PUBLICATIONS

Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.

(Continued)

*Primary Examiner* — Jason B Dunham
*Assistant Examiner* — Anand R Loharikar
(74) *Attorney, Agent, or Firm* — Polsinelli PC (57) ABSTRACT

Methods, systems, and apparatus, including computer programs encoded on computer storage media, for performing searches using an on-device directory. One of the methods includes providing, by a user device, a location of the user device to a server. Delta information is received that identifies merchants to be added to an on-device directory of the user device, wherein the merchants to be added are located in a geographic region that includes the location of the user device. An on-device directory on the user device is updated using the received information identifying merchants. A search query for merchants located in the geographic region is received. Information is obtained from the on device directory identifying one or more merchants that satisfy the query, and the information identifying the one or more merchants is provided in response to the query.

15 Claims, 3 Drawing Sheets

(56) References Cited

U.S. PATENT DOCUMENTS

| | | |
|---|---|---|
| D513,511 S | 1/2006 | Decombe |
| D528,556 S | 9/2006 | Decombe |
| 7,249,708 B2 | 7/2007 | McConnell et al. |
| 7,319,978 B2 | 1/2008 | Minamishin et al. |
| D590,412 S | 4/2009 | Saft et al. |
| D604,320 S | 11/2009 | Hoefnagels |
| D608,364 S | 1/2010 | Walsh et al. |
| D619,146 S | 7/2010 | Flik et al. |
| 7,792,709 B1 | 9/2010 | Trandal et al. |
| 7,797,724 B2 | 9/2010 | Calvin |
| D633,921 S | 3/2011 | Brinda |
| 7,930,624 B2 | 4/2011 | Phillips et al. |
| D640,269 S | 6/2011 | Chen |
| 7,991,665 B2 | 8/2011 | Hafner et al. |
| 8,024,267 B2 | 9/2011 | Olliphant et al. |
| 8,126,779 B2 | 2/2012 | Wanker |
| 8,140,418 B1 | 3/2012 | Casey et al. |
| 8,150,844 B2 | 4/2012 | Redstone et al. |
| D666,209 S | 8/2012 | Cranfill |
| 8,239,276 B2 | 8/2012 | Lin et al. |
| D666,630 S | 9/2012 | LeVee et al. |
| 8,266,014 B1 | 9/2012 | Bhosle et al. |
| 8,285,592 B2 | 10/2012 | Tomchek et al. |
| 8,285,604 B1 | 10/2012 | Trandal et al. |
| 8,369,842 B2 | 2/2013 | Proctor, Jr. et al. |
| 8,417,258 B2 | 4/2013 | Barnes, Jr. |
| 8,463,295 B1 | 6/2013 | Caralis et al. |
| 8,554,670 B1 | 10/2013 | Blank et al. |
| 8,645,222 B1 | 2/2014 | Tamassia et al. |
| 8,666,895 B2 | 3/2014 | Grigg et al. |
| 8,725,597 B2 | 5/2014 | Mauseth et al. |
| 8,751,316 B1 | 6/2014 | Fletchall et al. |
| 8,777,104 B1 | 7/2014 | Brock et al. |
| 8,967,471 B1 | 3/2015 | Rosenthal et al. |
| 9,031,866 B1 | 5/2015 | Ng et al. |
| 9,189,809 B1 | 11/2015 | Shieh et al. |
| 9,373,112 B1 | 6/2016 | Henderson et al. |
| D788,152 S | 5/2017 | Ovaice |
| 9,648,451 B1 | 5/2017 | Lee |
| 9,652,791 B1 | 5/2017 | Brock |
| 9,741,045 B1 | 8/2017 | Henderson et al. |
| 9,934,523 B1 | 4/2018 | Brock |
| 2002/0111907 A1 | 8/2002 | Ling |
| 2002/0147656 A1 | 10/2002 | Tam et al. |
| 2002/0160817 A1 | 10/2002 | Salmimaa et al. |
| 2002/0194121 A1 | 12/2002 | Takayama |
| 2003/0004743 A1* | 1/2003 | Callegari .......... G06F 17/30241 705/1.1 |
| 2005/0216371 A1 | 9/2005 | Fotteler et al. |
| 2006/0053392 A1 | 3/2006 | Salmimaa et al. |
| 2006/0093998 A1 | 5/2006 | Vertegaal |
| 2006/0123014 A1 | 6/2006 | Ng |
| 2006/0161599 A1 | 7/2006 | Rosen |
| 2007/0022375 A1 | 1/2007 | Walker |
| 2007/0136140 A1 | 6/2007 | Smith, Jr. |
| 2007/0136750 A1 | 6/2007 | Abanami et al. |
| 2007/0150354 A1 | 6/2007 | Walker et al. |
| 2007/0150414 A1 | 6/2007 | Templeton |
| 2007/0209023 A1 | 9/2007 | Nakagawa et al. |
| 2007/0290039 A1 | 12/2007 | Pfleging et al. |
| 2008/0033817 A1 | 2/2008 | Billmaier et al. |
| 2008/0080682 A1 | 4/2008 | Ogunwale et al. |
| 2008/0142599 A1 | 6/2008 | Benillouche et al. |
| 2008/0147507 A1 | 6/2008 | Langhammer |
| 2008/0147773 A1 | 6/2008 | Aaron |
| 2008/0162296 A1 | 7/2008 | Hanif et al. |
| 2008/0207296 A1 | 8/2008 | Lutnick et al. |
| 2008/0263455 A1 | 10/2008 | Stults et al. |
| 2008/0319843 A1 | 12/2008 | Moser et al. |
| 2009/0030787 A1 | 1/2009 | Pon et al. |
| 2009/0037502 A1 | 2/2009 | Gupta et al. |
| 2009/0043696 A1 | 2/2009 | Ornce et al. |
| 2009/0063304 A1 | 3/2009 | Meggs |
| 2009/0076896 A1 | 3/2009 | DeWitt et al. |
| 2009/0076925 A1 | 3/2009 | DeWitt et al. |
| 2009/0077493 A1 | 3/2009 | Hempel et al. |
| 2009/0125429 A1 | 5/2009 | Takayama |
| 2009/0171842 A1 | 7/2009 | Blythe |
| 2009/0177581 A1 | 7/2009 | Garcia et al. |
| 2009/0216676 A1 | 8/2009 | Mathur et al. |
| 2009/0241026 A1 | 9/2009 | Augustine et al. |
| 2009/0264070 A1 | 10/2009 | Lim |
| 2009/0298514 A1 | 12/2009 | Ullah |
| 2009/0313138 A1 | 12/2009 | Ratnakar |
| 2010/0051689 A1 | 3/2010 | Diamond |
| 2010/0070369 A1 | 3/2010 | Fenton et al. |
| 2010/0082445 A1 | 4/2010 | Hodge et al. |
| 2010/0082455 A1 | 4/2010 | Rosenblatt et al. |
| 2010/0082487 A1 | 4/2010 | Nelsen |
| 2010/0115460 A1 | 5/2010 | Pegg |
| 2010/0125495 A1 | 5/2010 | Smith et al. |
| 2010/0125510 A1 | 5/2010 | Smith et al. |
| 2010/0137004 A1 | 6/2010 | Ron et al. |
| 2010/0161400 A1 | 6/2010 | Snodgrass et al. |
| 2010/0174596 A1 | 7/2010 | Gilman et al. |
| 2010/0269059 A1 | 10/2010 | Othmer et al. |
| 2010/0306080 A1 | 12/2010 | Trandal et al. |
| 2011/0016051 A1 | 1/2011 | Trifiletti et al. |
| 2011/0054981 A1 | 3/2011 | Faith et al. |
| 2011/0057957 A1 | 3/2011 | Kasahara |
| 2011/0059784 A1 | 3/2011 | Lutnick et al. |
| 2011/0153440 A1 | 6/2011 | Singhal |
| 2011/0231292 A1 | 9/2011 | McCown |
| 2011/0238476 A1 | 9/2011 | Carr et al. |
| 2011/0238517 A1 | 9/2011 | Ramalingam et al. |
| 2011/0251892 A1 | 10/2011 | Laracey |
| 2011/0258058 A1 | 10/2011 | Carroll et al. |
| 2011/0264501 A1 | 10/2011 | Clyne |
| 2011/0276418 A1 | 11/2011 | Velani |
| 2012/0010930 A1 | 1/2012 | Langdon et al. |
| 2012/0016731 A1 | 1/2012 | Smith et al. |
| 2012/0078751 A1 | 3/2012 | MacPhail et al. |
| 2012/0084117 A1 | 4/2012 | Tavares et al. |
| 2012/0089470 A1 | 4/2012 | Barnes, Jr. |
| 2012/0109749 A1 | 5/2012 | Subramanian et al. |
| 2012/0109752 A1 | 5/2012 | Strutton et al. |
| 2012/0130790 A1 | 5/2012 | Lyons et al. |
| 2012/0130794 A1 | 5/2012 | Strieder |
| 2012/0150605 A1 | 6/2012 | Isaacson et al. |
| 2012/0150611 A1 | 6/2012 | Isaacson et al. |
| 2012/0158500 A1 | 6/2012 | Hochstatter et al. |
| 2012/0179516 A1 | 7/2012 | Fakhrai et al. |
| 2012/0190386 A1 | 7/2012 | Anderson |
| 2012/0191603 A1 | 7/2012 | Nuzzi |
| 2012/0197724 A1 | 8/2012 | Kendall |
| 2012/0203632 A1 | 8/2012 | Blum et al. |
| 2012/0209685 A1 | 8/2012 | Nealer et al. |
| 2012/0221421 A1 | 8/2012 | Hammad |
| 2012/0232994 A1 | 9/2012 | Kim et al. |
| 2012/0252418 A1 | 10/2012 | Kandekar et al. |
| 2012/0271692 A1 | 10/2012 | Huang et al. |
| 2012/0290376 A1 | 11/2012 | Dryer et al. |
| 2012/0290449 A1 | 11/2012 | Mullen et al. |
| 2012/0296724 A1 | 11/2012 | Faro et al. |
| 2012/0303425 A1 | 11/2012 | Katzin et al. |
| 2012/0316989 A1 | 12/2012 | Wong et al. |
| 2012/0330769 A1 | 12/2012 | Arceo |
| 2013/0013499 A1 | 1/2013 | Kalgi |
| 2013/0030913 A1 | 1/2013 | Zhu et al. |
| 2013/0036048 A1 | 2/2013 | Campos et al. |
| 2013/0036051 A1 | 2/2013 | Giordano et al. |
| 2013/0046589 A1 | 2/2013 | Grigg et al. |
| 2013/0054367 A1 | 2/2013 | Grigg et al. |
| 2013/0060623 A1 | 3/2013 | Walker et al. |
| 2013/0080280 A1 | 3/2013 | Scipioni |
| 2013/0085860 A1 | 4/2013 | Summers et al. |
| 2013/0090957 A1 | 4/2013 | Popkey et al. |
| 2013/0103760 A1 | 4/2013 | Golding et al. |
| 2013/0117155 A1 | 5/2013 | Glasgo |
| 2013/0132274 A1 | 5/2013 | Henderson et al. |
| 2013/0138500 A1 | 5/2013 | Charaniya et al. |
| 2013/0144674 A1 | 6/2013 | Kim et al. |
| 2013/0144702 A1 | 6/2013 | Tabor et al. |
| 2013/0151419 A1 | 6/2013 | Hitchcock et al. |

(56) References Cited

U.S. PATENT DOCUMENTS

| | | |
|---|---|---|
| 2013/0159086 A1 | 6/2013 | Richard |
| 2013/0159119 A1 | 6/2013 | Henderson et al. |
| 2013/0173320 A1 | 7/2013 | Bank et al. |
| 2013/0191173 A1 | 7/2013 | Shobola |
| 2013/0191199 A1 | 7/2013 | Corner |
| 2013/0198076 A1 | 8/2013 | Zambelli Hosmer et al. |
| 2013/0218683 A1 | 8/2013 | Hannan |
| 2013/0275222 A1 | 10/2013 | Amaro et al. |
| 2013/0275303 A1 | 10/2013 | Fiore et al. |
| 2013/0282488 A1 | 10/2013 | Blum et al. |
| 2013/0282490 A1 | 10/2013 | Kramer et al. |
| 2014/0052524 A1 | 2/2014 | Andersen |
| 2014/0052615 A1 | 2/2014 | Andersen |
| 2014/0330628 A1 | 11/2014 | Chen et al. |
| 2014/0337175 A1 | 11/2014 | Katzin et al. |
| 2015/0332223 A1 | 11/2015 | Aaron et al. |
| 2015/0332237 A1 | 11/2015 | Aaron et al. |

OTHER PUBLICATIONS

Non-Final Office Action dated Oct. 7, 2016, for U.S. Appl. No. 13/786,403, of Brock, Z., filed Mar. 5, 2013.
Final Office Action dated Jun. 6, 2017, for U.S. Appl. No. 13/786,403, of Brock, Z., filed Mar. 5, 2013.
Notice of Allowance dated Nov. 17, 2017, for U.S. Appl. No. 13/786,403, of Brock, Z., filed Mar. 5, 2013.
Final Office Action dated Apr. 19, 2018, for U.S. Appl. No. 13/800,349, of Henderson, W., et al., filed March 13, 2013.
International search report and Written Opinion for International Application No. PCT/US2013/044376 dated Nov. 26, 2013.
"ARC; ARC Releases Aero Trend to Support Financial Industry," Journal of Transportation, pp. 1-2, (Sep. 10, 2011).
Angel, G., "Using card transaction data," American Demographics—AdAge, published Aug. 1, 1998, Retrieved from the Internet URL: http://adage.com/article/american-demographics/card-transaction-data/43213/, pp. 1-10.
Mickiewicz, M., "How-to Track Global Search Trends," Sitepoint, dated Mar. 22, 2006, Retrieved from the Internet URL: http://www.sitepoint.com/how-to-track-global-search-trends/, p. 1.
Non-Final Office Action dated Aug. 23, 2013, for U.S. Appl. No. 13/627,615, of Henderson, W., et al., filed Sep. 26, 2012.
Final Office Action dated Dec. 23, 2013, for U.S. Appl. No. 13/627,615, of Henderson, W., et al., filed Sep. 26, 2012.
Non-Final Office Action dated Jun. 3, 2014, for U.S. Appl. No. 29/449,712, of Ovaice, A.W., filed Mar. 15, 2013.
Non-Final Office Action dated Jul. 31, 2014, for U.S. Appl. No. 13/911,030, of Andersen, R., filed Jun. 5, 2013.
Non-Final Office Action dated Sep. 23, 2014, for U.S. Appl. No. 13/627,615, of Henderson, W., et al., filed Sep. 26, 2012.
Final Office Action dated Dec. 18, 2014, for U.S. Appl. No. 13/627,615, of Henderson, W., et al., filed Sep. 26, 2012.
Non-Final Office Action dated Apr. 8, 2015, for U.S. Appl. No. 13/791,565, of Shieh, J., et al., filed Mar. 8, 2013.
Advisory Action dated May 4, 2015, for U.S. Appl. No. 13/627,615, of Henderson, W., et al., filed Sep. 26, 2012.
Non-Final Office Action dated May 11, 2015, for U.S. Appl. No. 13/800,349, of Henderson, W., et al., filed Mar. 13, 2013.
Final Office Action dated May 26, 2015, for U.S. Appl. No. 13/911,030, of Andersen, R., filed Jun. 5, 2013.
Non-Final Office Action dated May 29, 2015, for U.S. Appl. No. 13/627,602, of Henderson, W., et al., filed Sep. 26, 2012.
Non-Final Office Action dated Jun. 23, 2015, for U.S. Appl. No. 13/763,504, of Brock, Z., filed Feb. 8, 2013.
Final Office Action dated Jul. 1, 2015, for U.S. Appl. No. 13/791,565, of Shieh, J., et al., filed Mar. 8, 2013.
Non-Final Office Action dated Aug. 12, 2015, for U.S. Appl. No. 13/627,615, of Henderson, W., et al., filed Sep. 26, 2012.
Notice of Allowance dated Sep. 14, 2015, for U.S. Appl. No. 13/791,565, of Shieh, J., et al., filed Mar. 8, 2013.
Final Office Action dated Oct. 16, 2015, for U.S. Appl. No. 13/800,349, of Henderson, W., et al., filed Mar. 13, 2013.
Non-Final Office Action dated Dec. 3, 2015, for U.S. Appl. No. 13/911,039, of Andersen, R., filed Jun. 5, 2013.
Final Office Action dated Dec. 3, 2015, for U.S. Appl. No. 29/449,712, of Ovaice, A.W., filed Mar, 15, 2013.
Final Office Action dated Dec. 4, 2015, for U.S. Appl. No. 13/627,602, of Henderson, W., et al., filed Sep. 26, 2012.
Final Office Action dated Jan. 4, 2016, for U.S. Appl. No. 13/763,504, of Brock, Z., filed Feb. 8, 2013.
Non-Final Office Action dated Feb. 29, 2016, for U.S. Appl. No. 14/491,774, of Lee, B., filed Sep. 19, 2014.
Notice of Allowance dated Mar. 1, 2016, for U.S. Appl. No. 13/627,615, of Henderson, W., et al., filed Sep. 26, 2012.
Advisory Action dated Mar. 9, 2016, for U.S. Appl. No. 29/449,712, of Ovaice, A.W., filed Mar. 15, 2013.
Non-Final Office Action dated Mar. 14, 2016, for U.S. Appl. No. 13/841,254, of Brock, Z., filed Mar. 15, 2013.
Final Office Action dated Jun. 3, 2016, for U.S. Appl. No. 13/911,039, of Andersen, R., filed Jun. 5, 2013.
Non-Final Office Action dated Jul. 14, 2016, for U.S. Appl. No. 29/449,712, of Ovaice, A.W., filed Mar. 15, 2013.
Final Office Action dated Aug. 17, 2016, for U.S. Appl. No. 14/491,774, of Lee, B., filed Sep. 19, 2014.
Non-Final Office Action dated Aug. 23, 2016, for U.S. Appl. No. 13/800,349, of Henderson, W., et al., filed Mar. 13, 2013.
Non-Final Office Action dated Aug. 29, 2016, for U.S. Appl. No. 13/627,602, of Henderson, W., et al., filed Sep. 26, 2012.
Non-Final Office Action dated Sep. 12, 2016, for U.S. Appl. No. 13/763,504, of Brock, Z., filed Feb. 8, 2013.
Final Office Action dated Oct. 21, 2016, for U.S. Appl. No. 13/841,254, of Brock, Z., filed Mar. 15, 2013.
Advisory Action dated Oct. 26, 2016, for U.S. Appl. No. 14/491,774, of Lee, B. filed Sep. 19, 2014.
Non-Final Office Action dated Nov. 3, 2016, for U.S. Appl. No. 13/911,030, of Andersen, R., filed Jun. 5, 2013.
Non-Final Office Action dated Nov. 7, 2016, for U.S. Appl. No. 13/911,039, of Andersen, R., filed Jun. 5, 2013.
Notice of Allowance dated Dec. 14, 2016, for U.S. Appl. No. 14/491,774, of Lee, B., filed Sep. 19, 2014.
Notice of Allowance dated Jan. 6, 2017, for U.S. Appl. No. 13/763,504, of Brock, Z., filed Feb. 8, 2013.
Notice of Allowance dated Jan. 20, 2017, for U.S. Appl. No. 29/449,712, of Ovaice, A.W., filed Mar. 15, 2013.
Final Office Action dated Mar. 21, 2017, for U.S. Appl. No. 13/800,349, of Henderson, W., et al., filed Mar. 13, 2013.
Notice of Allowance dated Apr. 12, 2017, for U.S. Appl. No. 13/627,602, of Henderson, W., et al., filed Sep. 26, 2012.
Final Office Action dated May 18, 2017, for U.S. Appl. No. 13/911,030, of Andersen, R., filed Jun. 5, 2013.
Final Office Action dated Jun. 5, 2017, for U.S. Appl. No. 13/911,039, of Andersen, R., filed Jun. 5, 2013.
Non-Final Office Action dated Jun. 15, 2017, for U.S. Appl. No. 13/841,254, of Brock, Z., filed Mar. 15, 2013.
EIC 3600 Search Report dated Jun. 15, 2017, for U.S. Appl. No. 13/841,254, of Brock, Z., filed Mar. 15, 2013.
Non-Final Office Action dated Oct. 4, 2017, for U.S. Appl. No. 13/800,349, of Henderson, W., et al., filed Mar. 13, 2013.
Final Office Action dated Oct. 6, 2017, for U.S. Appl. No. 13/841,254, of Brock, Z., filed Mar. 15, 2013.
Non-Final Office Action dated Jan. 11, 2018, for U.S. Appl. No. 13/911,039, of Andersen, R., filed Jun. 5, 2013.
Non-Final Office Action dated Feb. 23, 2018, for U.S. Appl. No. 13/841,254, of Brock, Z., filed Mar. 15, 2013.
Advisory Action dated Aug. 23, 2018, for U.S. Appl. No. 13/800,349, of Henderson, W., et al., filed Mar. 13, 2013.
Final Office Action dated Sep. 4, 2018, for U.S. Appl. No. 13/911,039, of Andersen, R., filed Jun. 5, 2013.
Non-Final Office Action dated Sep. 5, 2018, for U.S. Appl. No. 13/911,030, of Andersen, R., filed Jun. 5, 2013.
Final Office Action dated Nov. 2, 2018, for U.S. Appl. No. 13/841,254, of Brock, Z., filed Mar. 15, 2013.

* cited by examiner

ON-DEVICE DIRECTORY SEARCH

CROSS-REFERENCE TO RELATED APPLICATIONS

This application is a divisional of U.S. application Ser. No. 13/786,403, filed on Mar. 5, 2013, entitled, "ON-DEVICE DIRECTORY SEARCH"; which is hereby expressly incorporated herein by reference in its entirety.

TECHNICAL FIELD

This disclosure relates to information retrieval on mobile devices.

BACKGROUND

When searching for merchants, a user can enter a search query into a search engine. The search query can include a merchant's name or a name of a desired product or service. The user can limit the search by location. The search engine can return results to the user in response to the search query and any limitations provided by the user. To perform a transaction (e.g., a purchase) with a merchant in the search results, the user must visit the merchant's retail store or the merchant's online shopping portal.

SUMMARY

This specification describes how a system can maintain, on a user device, an on-device directory that can be used for searching for merchants near the user device. When the user device moves to a new location, the system can update the on-device directory with only changes to a set of merchants considered to be near the new location of the user device. The system can update the on-device directory so that queries received by the user device will generally operate an on up-to-date on-device directory, and so that the user device need not contact a server to identify nearby merchants upon receiving a query.

In general, one innovative aspect of the subject matter described in this specification can be embodied in methods that include the actions of providing, by a user device, a location of the user device to a server; receiving delta information identifying merchants to be added to an on device directory of the user device, wherein the merchants to be added are located in a geographic region that includes the location of the user device; updating an on device directory on the user device using the received information identifying merchants; receiving a search query for merchants located in the geographic region; obtaining information from the on device directory identifying one or more merchants that satisfy the query; and providing the information identifying the one or more merchants in response to the query. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The delta information identifies merchants to be removed from the on device directory of the user device. The delta information identifies all merchants in the geographic region. The delta information identifying merchants to be added to an on device directory of the user device comprises information identifying merchants relevant to the geographic region. Receiving delta information identifying merchants to be added to an on device directory of the user device occurs before receiving the search query. Providing, by the user device, a location of the user device to a server comprises determining, by the user device, that the user device has transitioned to a new geographic region that is different from a previous geographic region.

In general, another innovative aspect of the subject matter described in this specification can be embodied in methods that include the actions of receiving, from a user device, a location of the user device; determining a first set of merchant information stored in an on device directory of the user device; determining a second set of merchants that are located in a geographic region that includes the location of the user device; determining delta information between the first set of merchants and the second set of merchants; and providing the delta information between the first set and the second set, wherein the delta information identifies merchants to be added to the on device directory of the user device. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The delta information identifies merchants to be removed from the on device directory of the user device. Determining the first set of merchant information stored in an on device directory of the user device comprises obtaining a previous location of the user device corresponding to a previous location update; and determining the first set of merchants including merchants that are located in a geographic region that includes the previous location of the user device. Determining the first set of merchant information stored in an on device directory of the user device comprises obtaining a set of merchants previously provided to the user device. The delta information identifies all merchants in the geographic region.

Advantages may include one or more of the following. A user can be provided with a list of merchants that are relevant to a query and based on the user's location. A user can perform searches for nearby merchants without requiring a user device to contact a server. This can allow the user device to provide searches for merchants in a geographic region even when network communication of the user device is unavailable. Providing delta information updates to the on-device directory minimizes latency when performing searches for merchants on the user device.

DETAILED DESCRIPTION

As an overview, the system allows a user to search for nearby merchants using a mobile device without requiring the mobile device to contact a server. Information about nearby merchants can be provided by a server to a mobile user device before a search query is issued on the mobile user device. The server can be part of a payment service system that processes payment transactions. The examples below will relate to payment service systems generally, although other systems that do not process payment transactions can also generate and provide such data.

A payment service system allows a user (also called a customer or payer) to purchase items from a merchant while physically present at the merchant, e.g., at the point of sale, or online, e.g., through a merchant's website. Some payment service systems process cardless payment transactions. A cardless payment transaction is one where a user conducts the transaction with a merchant at a point of sale or online by using a financial account without physically presenting or otherwise providing information about a payment card to the merchant at the point of sale. In fact, the merchant need not receive any details about the financial account, e.g., the credit card issuer, credit card number, and the like is not provided to the merchant.

Figure 1:
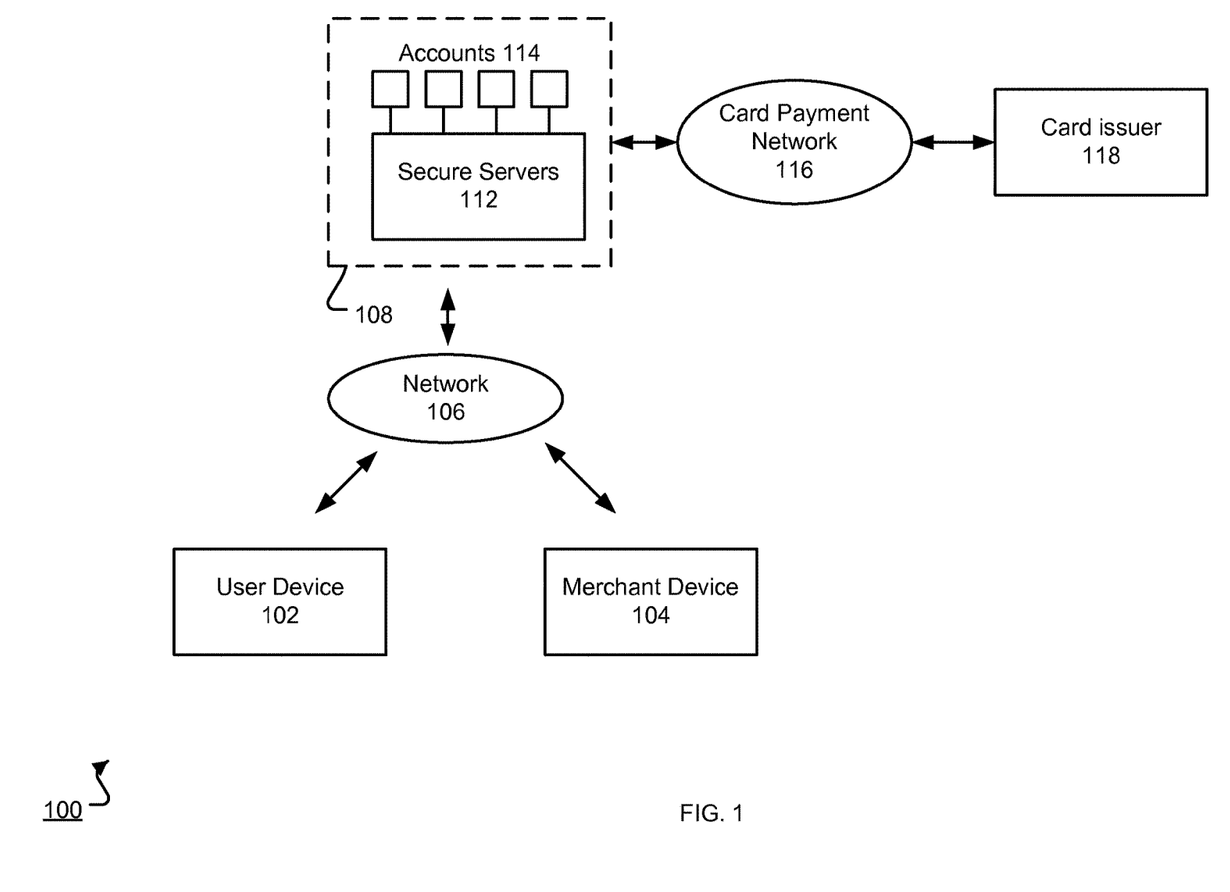
FIG. 1 is a schematic illustration of the architecture of an example payment system 100.

FIG. 1 is a schematic illustration of the architecture of an example payment system 100. The payment system 100 is an example of a system that can provide to mobile user devices merchant information of merchants that use payment system 100. The mobile user devices can use the merchant information to update and maintain on-device directory for locating such merchants.

The overall system 100 includes a user device 102, a merchant device 104, and a payment service system 108 connected to a network, e.g., the Internet 106. The user device 102 is a computing device capable of running software applications. For example, the user device 102 can be a desktop computer, laptop computer, smartphone, or tablet computer. The merchant device 104 is also a computing device, capable of processing transactions. The merchant device 104 can be a mobile device, a server, a desktop computer, a laptop computer, a dedicated point of sale system, or other data processing apparatus. By using the payment service system 108, the user device 102 and merchant device 104 can conduct a payment transaction, for example a cardless or online payment transaction.

The user and merchant devices can communicate with the payment service system 108 using the network 106. The payment service system 108 includes one or more servers 112, at least some of which can handle secure transactions (e.g., a secure server), to processes all transactions between the user device 102 and merchant device 104. In general, servers 112 can store public merchant information such as the merchant's address or phone number. The servers 112 can also be responsible for transferring or updating the user application to the user's mobile device or transferring or updating the merchant application to the merchant's computing device. In particular, the servers 112 can be responsible for sending information about merchants that have accounts with the cardless payment system to the user device 102. The servers 112 also handle secure information such as credit card numbers, debit card numbers, bank accounts, user accounts, user identifying information or other sensitive information.

The payment service system 108 can communicate electronically with a card payment network 116, e.g., Visa, Mastercard, or the like. The payment service system 108 can communicate with a computer system 116 of a card payment network, e.g., Visa or MasterCard. The payment service system 108 can communicate with a computer system 116 over the same network 106 used to communicate with the user device 102, or over a different network. The computer system 116 of the card payment network can communicate in turn with a computer system 118 of a card issuer, e.g., a bank. There can also be computer systems of other entities, e.g., the card acquirer, between the payment service system 108 and the card issuer.

Before a transaction between the user and the merchant can be performed, the user must create a user account with the payment service system 108 and the merchant must create a merchant account with the payment service system 108. The user can sign up using a mobile application or using an online website, and can use the mobile device 102 or another computing device, e.g., a home computer. At some point prior to the transaction, a user application is downloaded to the user device 102, e.g., through an application store. Creation of the user account can be handled through the user application, or through another application, e.g., a generic web browser. The user enters a name, account password, and contact information, e.g., email address. Before a transaction can be performed, the user also enters financial account information sufficient to conduct the transaction into the payment service system 108. For example, in the case of a credit card account, the user can enter the credit card issuer, credit card number and expiration date into the payment service system 108; the card validation value and mailing address may also be required. However, the financial account could also be associated with a debit card or pre-paid card, or another third party financial account.

In some implementations, the payment service system 108 requires additional personal identifying information before a transaction can be performed. For example, the payment service system 108 may require a photo of the user before a transaction can be performed. The photo of the user can be provided to the merchant at the point of sale so that the merchant can compare the photo to the person. In addition, the payment service system 108 can require a personal identification number (PIN) to be entered by the user. Other requirements can also be added to increase security. The data associated with a user account 114 can be stored at the servers 112, e.g., in a database.

The merchant can sign up for an account using the merchant device 104 or another device. The merchant enters a name, account password, and contact information, e.g., email address, and physical location information, e.g., an address, into the payment service system 108. The merchant can also provide other information, e.g., a list of goods or services available, operating hours, phone number, a small identifying image logo or mark, to the payment service system 108. The data associated with the merchant account 114 can be stored at the servers 112, e.g., in a database.

At some point prior to the transaction, a merchant application is downloaded to the merchant device 102, e.g., through an application store. Creation of the merchant account can be handled through the merchant application, or through another application, e.g., a generic web browser.

Eventually, in order to receive funds from the transaction, the merchant will need to enter financial account information into the payment service system sufficient to receive funds. For example, in the case of a bank account, the user can enter the bank account number and routing number.

However, the merchant's financial account can also be associated with a credit card account or another third party financial account. In addition, in some implementations, if the merchant has not entered the financial account information, the cardless payment processor can hold the received funds until the financial account information is provided.

Figure 2:
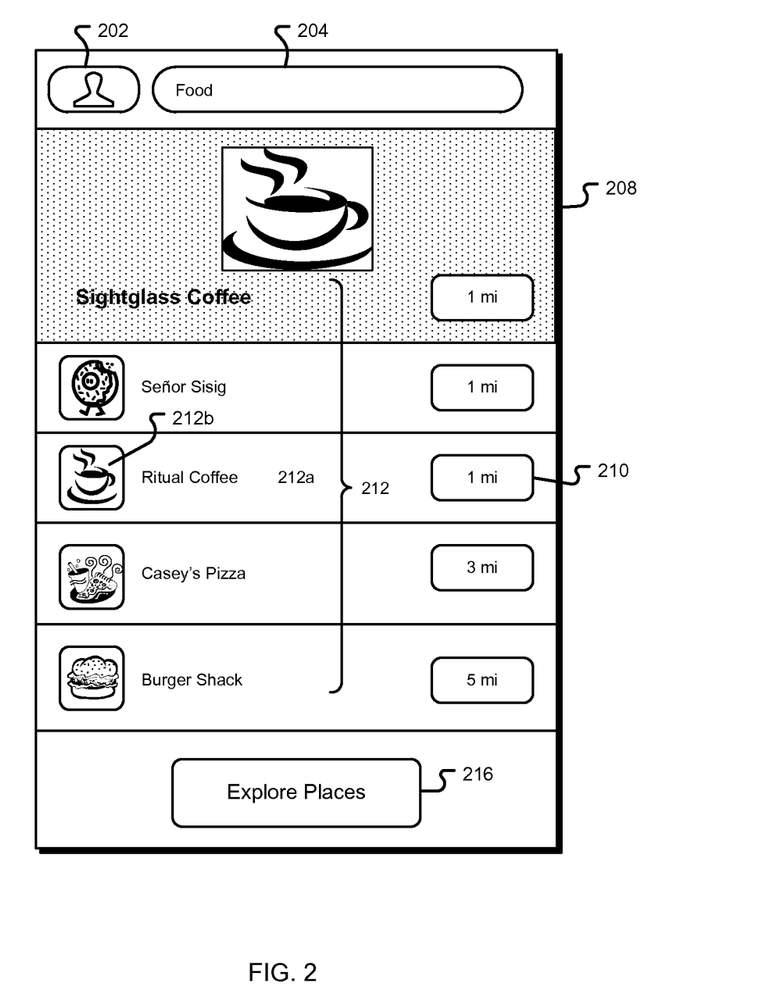
FIG. 2 is a diagram of example view of the user application's main page on a user's mobile device.

FIG. 2 is a diagram of an example view of an interface of a user application installed on a mobile user device. A user can use the example interface shown in FIG. 2 to issue a query to the user application, e.g. using search bar 204. In response to receiving the query, the user application can retrieve a list of merchants 212 from an on-device directory maintained on the user device.

In general, an on-device directory refers to an organized store of information about merchants that is stored locally on a mobile device. The on-device directory can be stored in random-access memory, internal non-volatile memory, on a locally removable storage device, e.g., a micro-SD card.

The user application can access the on-device directory in order to obtain information about merchants, for example, in response to a search query issued by a user of the user application. The on-device directory can be implemented as a database, as a flat file, as an inverted index, e.g. having multiple posting lists, or any of a variety of other techniques for performing information retrieval.

The user application can contact a server of an associated payment service system and can populate the on-device directory with merchants that have an account with the payment service system. The server of the payment service system can provide the user application with a list of merchants having accounts with the payment service system and who have opted-in to having their information used in this way. In some implementations, the server can also provide the user application with information obtained from other sources, for example, merchant information obtained by crawling resources on the Internet.

The user application, upon being installed, can submit an initial request to the server to construct the on-device directory for the first time. After the on-device directory is constructed, upon receiving a query the user application can first obtain a list of merchants using merchant information stored in the on-device directory. If insufficient merchant information is obtained from the on-device directory, the user application can then provide the query over a network to the server to obtain additional information about merchants that satisfy the query.

The user application can also display a default list of merchants in the absence of receiving a query, for example, when the user application first starts up. The user application can display the default list of merchants as list of participating merchants that are within a particular distance of the user device. The user application can also display a user's favorite or saved merchants. In some implementations, the user application can automatically populate the default list of merchants with information about merchants that the user has visited recently or which whom the user has recently conducted a purchase transaction user the payment service system.

Upon receiving a query in search bar 204, the application can obtain information about merchants and can display the information about the merchants 212 as a list on a display of the user device. The list of merchants can be organized into a plurality of rows, each row containing the name 212a of a single merchant. The list can also include an icon 212b for each merchant, e.g., located in the row with the name of the merchant. For example, each merchant's icon 212b can be located on the left side of the name 212a of the merchant. In some implementations, a cover image 208 for a merchant, e.g., the first merchant in the list, is displayed. The application can display a distance 210 that a merchant is located from a current location of the mobile device. Again, the distance 210 can be located in the row with the name 212a of the merchant, e.g., on the right side of the name 212 of the merchant. The application can store the merchant information shown in FIG. 2 in the on-device directory. However, in some implementations, the application can retrieve some items of information, e.g. a merchant icon, from a server only for merchants that appear as a number of top-ranked search results for the query.

Each merchant can be represented with a custom-designed "card". In some implementations, tapping the row containing the name 212a of the merchant, or tapping the name 212a of the merchant, will cause the user's mobile device to display more information regarding the respective merchant. The mobile device may need to contact a server to retrieve this information, which can keep the size of the on-device directory small. In some implementations, the additional merchant information is represented by a custom-designed merchant page. For example, the mobile device can display a map around the merchant's area, the merchant's phone number, the merchant's operating hours, or other merchant information. The application can also present user account information in response to the user tapping an account button 202.

The application also allows the user to "Explore Places" 216. In some implementations, this opens a list of nearby or featured merchants that are associated with the payment system. A user then has an option to learn more about one of the merchants in the list.

Figure 3:
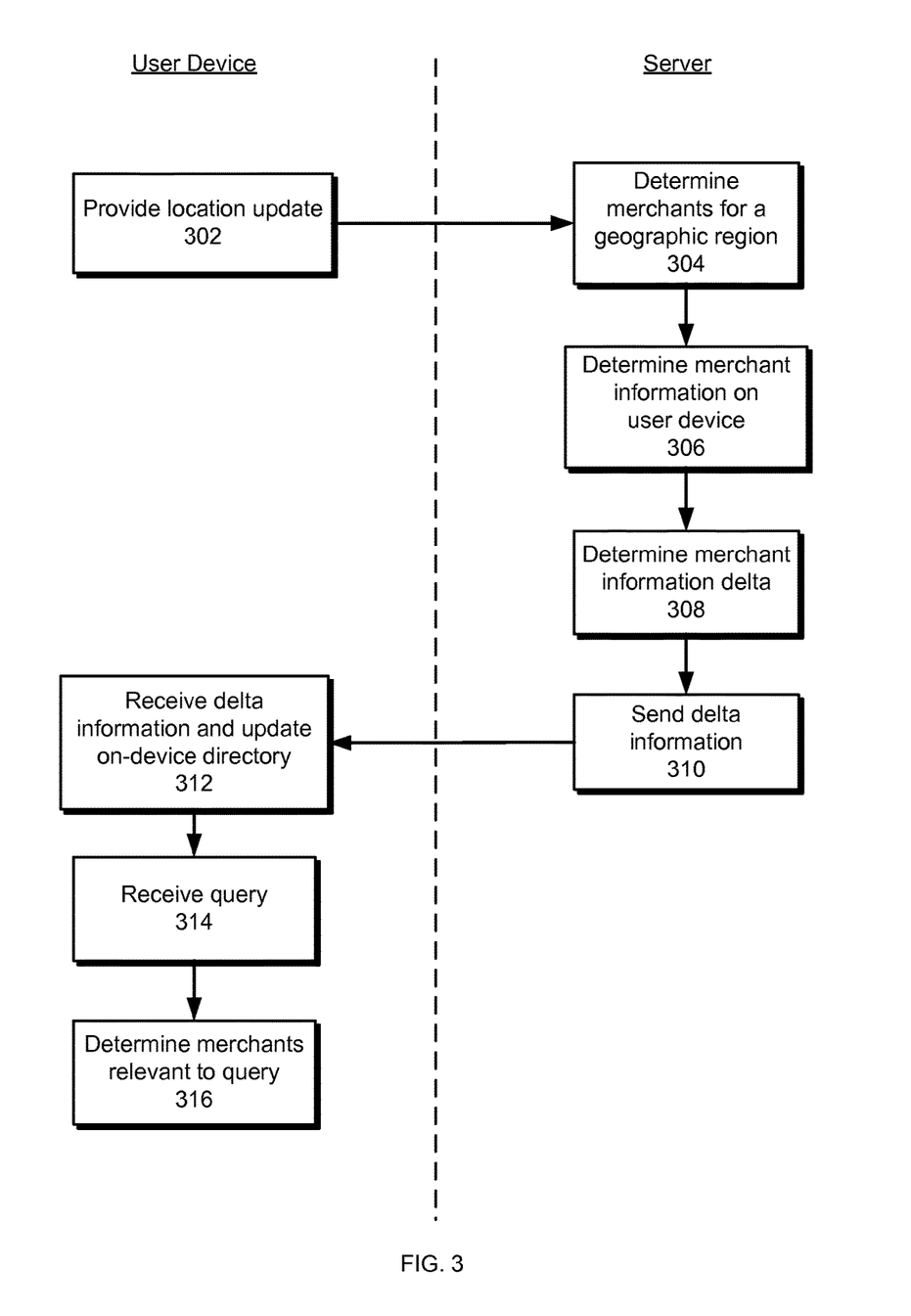
FIG. 3 is a sequence diagram that illustrates performing on device directory searching.

FIG. 3 is a sequence diagram that illustrates performing on-device directory searching. The user device generally provides location updates to a server, e.g. of a payment service system, in order to trigger an update of the on-device directory maintained on the user device. If the on-device directory needs updating based on the location update, the server can send a delta between information about merchants already stored in the on-device directory of the user device and information about merchants that are currently near the location of the user device, but which are not yet stored in the on-device directory.

The user device can then update the on-device directory with the received merchant information before receiving a search query from a user. Thus, when a search query is received from a user, the user device will typically already have up-to-date information about nearby merchants, allowing the user device to complete the search request without contacting the server.

The user device provides a location update to the server (302). For example, the user device can determine its own location based on GPS information, cellphone data, wireless network data, or the like and provide the location information to the server.

The user application installed on the user device can provide automatic location updates to the payment service system upon startup, intermittently or at certain intervals, or due to a variety of other triggering events. Generally, the location updates are provided automatically without input or action by a user of the user device. For example, some functionality of the user application can run in a background thread that is not indicated on a user interface of the user application.

The user application can provide a location update to the server that requests an on-device directory update due to a variety of events. For example, the user application can maintain the coordinates of the last location at which the user device provided a location update to the server. The user application can then provide a location update to the server if the current location of the user device is beyond a particular threshold distance from the previous location, e.g. when the user device is more than one, five, or 10 miles from the previous location. In some implementations, the threshold distance depends on a merchant density in the particular geographic region.

In some implementations, the user device can receive from the server geographic area definitions, e.g. neighborhood and city definitions. The user device can then send a location update to the server when the user device transitions between two geographic areas. For example, if the user travels from one neighborhood to another neighborhood, the user application can send a location update to the server. Alternatively, the server can maintain the geographic area definitions and trigger an on-device update when the user transitions from one geographic area to another.

The server determines merchants in a geographic region based on the received location (304). The server can maintain a merchant directory, which for example, can include the merchant information described above with reference to FIG. 2, including the merchant name, a merchant category, e.g., a merchant category code (MCC), a merchant location, e.g. an address or geographic coordinates, in addition to other types of merchant information.

The server can use the merchant directory to identify merchants that are located in a geographic region that includes the received location of the user device. The server can for example dynamically determine a list of merchants that are located within a predetermined distance of the location of the user device. The server can compute distances between the location of the user device and each merchant in the merchant directory and select merchants that are within a threshold distance, e.g. merchants that are within 1 mile of the user device. The server can also use the computed distances to determine a predetermined number of merchants that are closest to the user device, e.g. the 100, 500, or 1000 closest merchants.

The server can also identify all merchants known to the server that are located within a predefined geographic region that includes the location of the user device. If the server is part of a payment service system, the server can for example identify all merchants signed up for the payment service system that are located within the geographic region. The geographic region can be a neighborhood, a city, a state, or a country. For example, if the location of the user device is San Francisco, Calif., the server can identify all merchants within the city limits of San Francisco, Calif.

The server determines merchant information on the user device (306). In order to minimize the amount of data that the server provides to the user device, the server can first determine merchant information that is already stored on the user device, which can be done in a variety of ways.

To determine merchant information stored on the user device, the server can access a previously stored location of the user device and determine a second list of merchants for that previous location, in essence repeating step 304 but for a previously provided location of the user device. The server can also access a separately maintained list of merchants that the server has previously provided to the user device. In many situations, the server may determine that no merchant information is yet stored on the user device, for example, when the user application on the user device is first installed or is first starting up.

The server determines a delta between merchant information for the geographic region of the user device and merchant information stored on the device (308). The delta information can identify both (1) a set of merchants that should be added to the on-device directory, e.g. merchants that are near the current location of the user device, and (2) a set of merchants that should be removed from the on-device directory, e.g. merchants that were near the previous location of the user device but which are no longer near the current location of the user device.

In some implementations, the server can instead provide merchant information for all merchants at the current geographic location of the user device and allow the user application installed on the user device to determine the delta information indicating which merchants to add to and which merchants to remove from the on-device directory.

The server sends the delta information to the user device (310). For example, the delta information can identify merchants to be added to the on-device directory and merchants to be removed from the on-device directory. In some implementations, the delta information includes two lists of merchant identifiers: one list identifying merchants to be added to the on-device directory, and one list identifying merchants to be removed from the on-device directory. To conserve network bandwidth, the delta information can include all merchant information for merchants to be added, but include only merchant identifiers for merchants to be removed.

The user device receives the delta information and updates the on-device directory (312). In some situations, the delta information includes a full list of merchants to include in the on-device directory. For example, after taking a flight the on-device directory of nearby merchants may need to be completely replaced. Thus, the delta information can include data, e.g. a "replace all" flag, indicating to the user device that the on-device directory should be completely rebuilt using the delta information.

The user device can update the on-device directory according to the delta information in a variety of ways. The user device generally adds merchant information to the on-device directory for merchants in the "add" list, and removes merchant information from the on-device directory for merchants in the "remove" list. The specifics of updating the on-device directory will depend on the particular implementation. For example, if the on-device directory is a database, the user device can add database records corresponding to merchants on the "add" list can remove database records corresponding to merchants on the "remove" list.

The user device receives a query (314). For example, with reference to FIG. 2, the user device can receive a query through a search bar of a user application installed on the user device. Because the delta information received from the server will typically be relatively small compared to all the information stored in the on-device directory, the user device will typically already have an up-to-date on-device directory by the time a user enters a search query.

In response to the query, the user device determines merchants that are relevant to the query (316). For example, the user application can use the current location of the user device to determine a set of merchants that are closest to the current location. Distances between the user device and each of the merchants can be computed by the user device using merchant location information stored in the on-device directory.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, at a server and from a user device, a first location of the user device;
   determining, by the server, a first set of merchants within a first geographical region that includes the first location of the user device;
   sending, by the server, the first set of merchants to the user device to be stored in an on-device directory of the user device;
   determining, at the server, a change in location of the user device based on information received on a second location of the user device that is different from the first location of the user device;
   determining, by the server, delta information identifying a difference between merchants included in the first set of merchants and merchants included in a second set of merchants within a second geographical region that includes the second location of the user device; and
   sending, by the server, the delta information to the user device for updating the on-device directory of the user device to enable the user device to search for merchants relative to the second location of the user device without communicating with the server.

2. The computer-implemented method of claim 1, wherein the delta information identifies merchants to be removed from the on-device directory of the user device that are included the first set of merchants but are not included in the second set of merchants.

3. The computer-implemented method of claim 1, wherein the delta information identifies merchants to be added to the on-device directory of the user device that are not included the first set of merchants but are included in the second set of merchants.

4. The computer-implemented method of claim 1, wherein a change in a geographical position of the user device triggers the user device to send the information on the second location to the server.

5. The computer-implemented method of claim 1, wherein determining the second set of merchants comprises identifying merchants that are within a threshold distance of the second location of the user device.

6. A device comprising:
   memory having computer-readable instructions stored therein; and
   one or more processors configured to execute the computer-readable instructions to:
   receive, from a user device, a first location of the user device;
   determine a first set of merchants within a first geographical region that includes the first location of the user device;
   send the first set of merchants to the user device to be stored in an on-device directory of the user device;
   determine a change in location of the user device based on information received on a second location of the user device that is different from the first location of the user device;
   determine delta information identifying a difference between merchants included in the first set of merchants and merchants included in a second set of merchants within a second geographical region that includes the second location of the user device; and
   send the delta information to the user device for updating the on-device directory of the user device to enable the user device to search for merchants relative to the second location of the user device without communicating with the device.

7. The device of claim 6, wherein the delta information identifies merchants to be removed from the on-device directory of the user device that are included the first set of merchants but are not included in the second set of merchants.

8. The device of claim 6, wherein the delta information identifies merchants to be added to the on-device directory of the user device that are not included the first set of merchants but are included in the second set of merchants.

9. The device of claim 6, wherein a change in a geographical position of the user device triggers the user device to send the information on the second location to device.

10. The device of claim 6, wherein the one or more processors are configured to execute the computer-readable instructions to determine the second set of merchants by identifying merchants that are within a threshold distance of the second location of the user device.

11. One or more non-transitory computer-readable medium comprising computer-readable instructions stored therein, which when executed by one or more processors of a server, cause the one or more processors to:
- receive, from a user device, a first location of the user device;
- determine a first set of merchants within a first geographical region that includes the first location of the user device;
- send the first set of merchants to the user device to be stored in an on-device directory of the user device;
- determine a change in location of the user device based on information received on a second location of the user device that is different from the first location of the user device;
- determine delta information identifying a difference between merchants included in the first set of merchants and merchants included in a second set of merchants within a second geographical region that includes the second location of the user device; and
- send the delta information to the user device for updating the on-device directory of the user device to enable the user device to search for merchants relative to the second location of the user device without communicating with the server.

12. The one or more non-transitory computer-readable medium of claim 11, wherein the delta information identifies merchants to be removed from the on-device directory of the user device that are included the first set of merchants but are not included in the second set of merchants.

13. The one or more non-transitory computer-readable medium of claim 11, wherein the delta information identifies merchants to be added to the on-device directory of the user device that are not included the first set of merchants but are included in the second set of merchants.

14. The one or more non-transitory computer-readable medium of claim 11, wherein the first location and the second location of the user device are geographically apart by at least a threshold distance.

15. The one or more non-transitory computer-readable medium of claim 11, wherein execution of the computer-readable instructions by the one or more processors, cause the one or more processors to determine the second set of merchants by identifying merchants that are within a threshold distance of the second location of the user device.

* * * * *